May 7, 1940.     M. J. MARTIN     2,199,891
RAPID SAND FILTER
Filed July 14, 1937
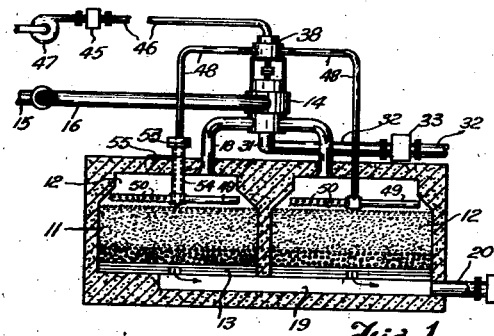
Fig. 1.
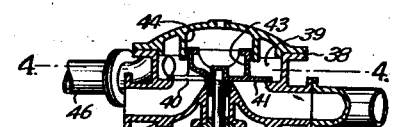
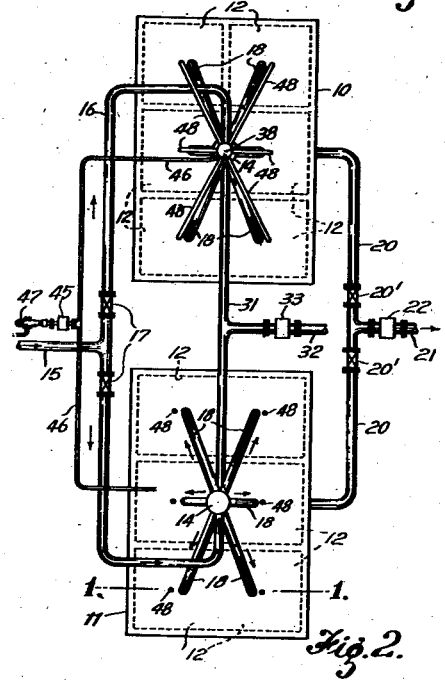
Fig. 2.
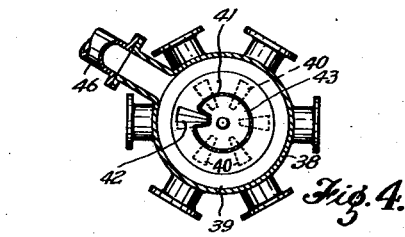
Fig. 3.
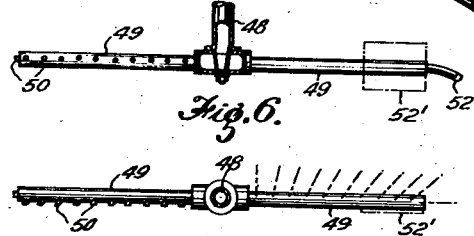
Fig. 4.
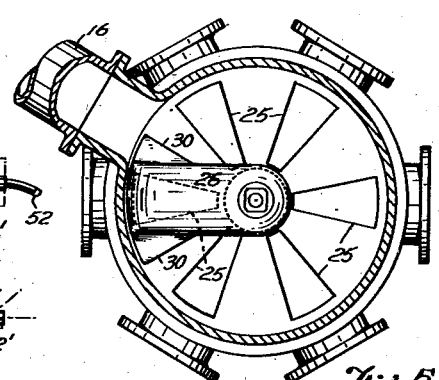
Fig. 5.
Fig. 6.
Fig. 7.
Fig. 8.
M. J. Martin
INVENTOR
By: Glascock Downing & Seebold
Attys Patented May 7, 1940

2,199,891

UNITED STATES PATENT OFFICE 2,199,891

RAPID SAND FILTER

Michael James Martin, Armadale, Victoria, Australia

Application July 14, 1937, Serial No. 153,598
In Australia July 23, 1936

14 Claims. (Cl. 210—144)

This invention relates to improvements in rapid sand filters and refers especially to improved methods of and apparatus for effectively cleansing the beds of enclosed filter chambers to remove accumulated impurities therefrom.

The cleansing operation is usually effected by passing filtered water in a reverse direction—i. e. upwardly—through the filter bed whereby the impurities are discharged from the top of the filter chamber through a suitable outlet.

The upward flow of wash water may be effected at a relatively low rate in which case it is necessary to agitate the bed by extraneous means, as for example by the injection of compressed air or steam, or by rotating rakes, in order to dislodge impurities from the sand bed.

This method of cleansing is known as the "low velocity" wash method.

An alternative method known as the "high velocity" method consists in passing the wash water upwardly through the filter bed at a rate sufficient to effect hydraulic suspension of the grains thereof and to agitate said grains with such vigor as to dislodge and break up the gelatinous material which accumulates on the surface of the filter bed. This latter method, therefore, obviates the need for extraneous agitating means and provides the further advantage that, upon the cessation of the upward flow of wash water, the particles forming the bed automatically settle in order or size or density.

The present invention relates primarily to filters which are cleansed by the aforesaid high velocity method.

A further procedure which has recently been employed in conjunction with an upward flow of wash water consists in projecting jets of filtered or unfiltered water at a relatively high velocity on to the surface of the filter bed in order to more effectively break up the matter accumulated thereon, and thus facilitate its discharge from the filter by the upward current of water introduced below the filter bed.

Now the objects of the present invention are to provide an improved method of and improved means for effectively cleansing a filter bed by applying thereto a surface wash in conjunction with an upward flow of wash water preferably at a high velocity through the filter bed.

One broad feature of the invention resides in substantially simultaneously commencing to apply a surface wash and an upward wash to a filter bed, causing the surface wash to reach its maximum rate prior to the upward wash and then terminating the surface wash whilst the upward wash is still proceeding, characterised by automatically controlling the rate of discharge from the filter of the combined flows of wash water.

Another broad feature of the invention resides in apparatus comprising an enclosed filter chamber having a filter bed therein, means for passing wash water upwardly through the filter bed, means for directing wash water under a relatively high pressure and at a controlled rate onto the surface of the filter bed, valve means operable in unison for causing the respective flows of wash water to commence substantially in unison and for terminating the surface wash whilst the upward wash is still proceeding, means for discharging the wash water from said filter chamber and a rate control valve in said wash water discharge means.

A further feature of the invention resides in the provision of rotary means for delivering the surface wash water on to the filter bed.

The valves for controlling the supply of wash water for the surface wash and the upward wash respectively may advantageously be arranged to operate in unison, means being provided to enable the phase relationship of the valves to be adjusted.

The invention is concerned particularly with that type of filter which embodies one or more groups of enclosed filter chambers containing such a number of chambers that each individual chamber may be cleansed by the high velocity method by directing thereinto the combined flow of filtered water passing at a normal rate from the remaining chambers.

It is known in the art to provide a rotary valve by the operation of which the chambers in such a group may be successively cleansed and another feature of this present invention resides in employing a second rotary valve of analogous type for controlling the supply of surface wash water and in operating said additional valve in unison with a rotary valve arranged to control the supply of impure water and the upward flow of wash water substantially as known.

Other objects and features of the invention are set out in the ensuing description.

In the drawing which is somewhat diagrammatic in character and which shows illustrative forms of the invention:

Figure 1 is a view in vertical section (taken on the line 1—1 of Figure 2) of a filter constructed and arranged in accordance with the invention.

Figure 2 is a view in plan of the filter shown in Figure 1 and is drawn to a smaller scale.

Figure 3 is a view in vertical section of valve means and is drawn to a larger scale.

Figure 4 is a view in sectional plan taken on the line 4—4 of Figure 3.

Figure 5 is a view in sectional plan taken on the line 5—5 of Figure 3.

Figure 6 is a view in elevation partly in section of a rotary distributor for wash water.

Figure 7 is a view in plan of the rotary distributor shown in Figure 6; and

Figure 8 is a view in cross-section taken on the line 8—8 of Figure 6.

Referring particularly to Figures 1 and 2 of the drawing two groups 10 and 11 respectively of filter chambers are arranged in juxtaposition each of such groups consisting of six individual enclosed filter chambers 12 provided with the usual beds of graded sand and gravel supported by a suitable strainer system which is generally designated as 13.

As shown in the drawing each group of filter chambers is in the form of a unitary reinforced concrete structure though this arrangement is immaterial to the invention, as any suitable form of filter chamber may be used.

A distribution valve, generally designated by the reference numeral 14, is arranged centrally above each group of filter chambers, and impure water is supplied thereto from main 15 through branch pipes 16. Each of the branch pipes is fitted with a stop valve 17 to enable the respective group of filter chambers to be isolated when desired.

The impure water so delivered to each distribution valve 14 passes through radially arranged pipes 18 to the upper ends of the filter chambers 12 and thence downwardly through the filter beds therein.

The filter chambers 12 of each group communicate at their lower ends with a common effluent chamber 19 to which an effluent branch pipe 20 provided with a stop valve 20' is connected.

The effluent branch pipes 20 from the two groups of chambers connect with a common effluent pipe 21 fitted with a combined rate control and cut-off valve 22 of any suitable type.

The construction of each of the distribution valves 14 is shown in greater detail in Figures 3 and 5. Thus the valve includes an inlet chamber 23 to which the branch 16 of the impure water main 15 is connected and the lower end of this chamber 23 is closed by a flat horizontal valve seat 24 provided with equally spaced radial ports 25 each of which communicates with one of the aforesaid pipes 18 leading to the upper ends of the individual filter chambers.

A radial valve member 26 arranged within the inlet chamber of the valve 14 engages the valve seat 24 and is connected to a vertical spindle 27 which passes centrally through the top of the chamber and which serves for imparting rotary motion to the said valve member.

The underside of the valve member 26 is formed with a passage 28 the inner end of which is in constant communication with a waste water discharge port 29 provided axially in the valve seat whilst the outer end of the valve passage 28 is adapted to successively register with the aforesaid radially disposed ports 25 when the valve member is rotated. It will be evident that, when the valve passage 28 is in register with any one of the radial ports 25, the supply of impure water to the respective filter chamber is cut off and that the upper end of said chamber is in communication with the central waste water discharge port 29. In order to prevent impure water passing direct from the chamber 23 to the port 29 as the valve member is moving into and out of register with a radial port 25 the said valve member is provided with lateral extensions 30 which closely engage the valve seat.

It will be evident also from an inspection of the drawing that, when the valve member 26 is disposed intermediate any pair of radial ports 25 (which is its normal position) all of such ports communicate with the inlet chamber 23 of the valve.

The waste wash water discharge port 29 of each valve 14 communicates with an individual discharge pipe 31 and the pipes 31 from the two groups of filter chambers are connected to a common discharge pipe 32 fitted with a rate control valve 33 of any approved type (see Figures 1 and 2).

Referring back to Figure 3, the valve spindle 27 is connected through suitable reduction gearing 34 with an electric motor 35. This motor may be controlled either manually or automatically by means not forming part of the present invention, or alternatively the valve member 26 may be actuated manually as by means of a crank handle fitted to spindle 36 embodied in the said reduction gearing.

Irrespective of the manner in which the valve member is actuated it is preferred, when the respective group of filter chambers require cleaning, to cause said valve member to undergo at least one complete revolution at a slow speed. When this operation is carried out, the supply of impure water to the filter chambers is successively cut off such chambers being successively connected to the waste wash water discharge port 29. Thus, as hereinafter described, whilst the valve member 26 undergoes one complete revolution, the filter chambers of the respective group are successively cleansed.

The upper end of each valve spindle 27 is connected by an adjustable coupling 27' to the lower end of a coaxially arranged spindle 37 which extends centrally into a second valve casing 38. This valve casing 38 contains an inlet chamber 39 the lower end of which is formed with a flat valve seat provided with a plurality of equally spaced radial ports 40 corresponding in number to the filter chambers 12 in the group. A rotary valve member 41 in the form of a flat disc engages the valve seat and is provided with a single aperture 42 capable of successively registering with the radial ports 40.

In order to relieve the downward pressure on the valve seat, the valve member 41 may be formed with an upward tubular extension 43 constituting a piston, provided with suitable sealing means, which engages a cylinder 44 formed in the valve casing, said cylinder communicating with the atmosphere or other source of low pressure.

During the normal filtering operation, the aperture 42 in the valve disc 41 is disposed intermediate a pair of radially disposed ports 40 in the valve seat whereby all of said ports are shut off from communication with the inlet chamber 39.

Water (which has preferably been filtered) is delivered to the inlet chamber 39 of the valve casing 38 by means of a pipe 46 provided with a rate control valve 45 and leading from a centrifugal pump 47 or other source of high pressure.

As shown diagrammatically in Figure 2 the pipes 46 leading to the valves 38 of the respective groups of filter chambers are preferably connected to a common pipe to which the pump 47 is connected whereby the one pump will serve the two groups of filter chambers.

Each of the radial ports 40 in each valve casing 38 communicates with an individual pipe 48 leading into the top of one of the filter chambers of the respective group (see Figures 1 and 2).

It will be noted that, for the sake of clarity, valve 38 and the pipes 48 associated therewith have not been shown on the lower group 11 of filter chambers of Figure 2.

As shown chiefly in Figure 1 the pipes 48 are connected within the respective filter chambers to horizontally arranged distribution pipes 49 which are disposed somewhat above the normal level of the surface of the filter bed. The pipes 49 are provided with nozzles at suitable intervals and at suitable inclinations to direct the jets of water which issue therethrough onto the surfaces of the filter beds. The pipes 49 may be fixed or movable and may be arranged in various ways, the arrangement to be adopted in any particular filter being influenced by the shape of the filter chambers and by other factors.

In the preferred arrangement, however, the distribution pipes are rotatable in horizontal planes for which purpose they may be pivotally mounted on the lower ends of the pipes 48 as shown more clearly in Figures 6, 7 and 8 of the drawing.

In these figures a single distribution pipe 49 formed of coaxially aligned sections, is pivoted centrally on the lower end of the respective branch pipe 48, the distribution pipe being provided on each side of the pivotal axis with two sets of nozzles 50 and 51 respectively, the former of which are arranged horizontally whilst the latter are inclined downwards (see Figure 8). Nozzles are also arranged at the ends of the pipe 49 as shown. The rotation of the pipe 49 is effected by the reaction of the jets discharged from the nozzles.

It will be noted that, when viewed in plan (Figure 7) the nozzles disposed adjacent the pivotal axis are directed approximately radially of the pipe 49 whilst as they approach the outer ends of the pipe 49 said nozzles are directed outwardly at increasing angles towards the walls of the chamber. This disposition of the nozzles is indicated more clearly by the center lines at the right hand side of Figure 7.

Furthermore, the sizes of the nozzles preferably increase from a minimum adjacent the pivotal axis to a maximum at the free ends of the pipe 49 and the distance therebetween may decrease towards the free ends.

In these various ways the projected jets of water tend to subject substantially the whole surface of the bed to a fairly uniform disintegrating action during the rotation of the distribution pipe 49. If desired, flexible extensions as of rubber hose may be connected to the ends of the distribution pipe 49 to more effectively direct water jets into the corners of the respective filter chambers. A portion of one such flexible extension is indicated at 52 in Figure 6.

It will be evident that, when desired (as e. g. when the filter chambers are of oblong shape in plan) two or more rotatable distributor pipes 49 may be arranged in each filter chamber.

In order that the jets discharged by a rotary distribution pipe will serve to mechanically break up the accumulated material on the surface of the filter bed, said jets must leave the distribution pipe at a substantial velocity relatively to the filter chamber. Consequently it is important to prevent an excessive rate of rotation of the said pipe 49. For this purpose the rotation of the pipe may be retarded as by means of a vane 52 (shown in broken lines in Figures 6 and 7), by arranging some of the nozzles 50 to act in opposition to the majority of such nozzles (as shown in broken lines in Figure 8) or by rotating the sections of the distribution pipe 49 about their axes to vary the inclinations of the nozzles from the positions shown in Figure 8.

Alternatively the rate of rotation of each distribution pipe 49 may be controlled as by a suitable friction device 53 (shown diagrammatically at the left-hand side of Figure 1), which is located above the respective filter chamber and fitted to a tubular spindle 54 connected to the distribution pipe and enclosing the lower portion of the pipe 48.

An indicator hand 55 may also be fitted to the tubular spindle 54 so that the rate of rotation may be readily ascertained.

In lieu of utilising the energy of the issuing jets to rotate the distribution pipes 49 they may be otherwise rotated in any approved manner.

In the normal operation of the filter plant the valve members 26 of the distribution valves 14 are arranged in inoperative positions intermediate an adjacent pair of radial ports 25 all of which are thus in communication with the respective inlet chambers 23 of the valves. The valve discs 41 in the upper valve casings 38 are also arranged in inoperative positions—that is to say the aperture 42 in each valve disc is arranged intermediate an adjacent pair of radial ports 40 all of which are therefore closed.

Consequently raw water from the main 15 passes into each of the distribution valves, thence downwardly through each of the 12 filter chambers in the two groups and finally the filtered water is discharged through the common effluent pipe 21 and the rate control valve 22 therein. The paths of the water are indicated by arrows in Figures 1 and 2.

When the filter requires cleansing as indicated by the loss of head across the filter beds the cut-off valve 22 in the pipe 21 is closed to prevent the flow of water therethrough and the motor 35 associated with one of the distribution valves 14 is started up to cause the respective valve member 26 to slowly rotate. The closing of valve 22 and the starting up of the motor are preferably effected automatically and simultaneously, though the means for effecting this result do not form part of this invention.

As previously described the valve member 26 is mechanically coupled to the valve member 41 in the casing 38 disposed thereabove and thus the two valve members rotate in unison.

During the initial movement of the valve members 26 and 41, the aperture 42 in the latter valve member commences to uncover the adjacent radial port 40 at substantially the same time as the passage 28 in the valve member 26 commences to communicate with the corresponding radial port 25.

The centrifugal pump 47 is started up either automatically or manually at or about the time the motor 35 is started, and consequently, under the circumstances just described, water (preferably filtered water) is delivered at a relatively high pressure from any convenient source by the pump through the respective valve casing 38 and through the rate control valve 45 and the appropriate pipe 48 to the respective filter chamber 12. This water issues from the nozzles 50 in the distribution pipe 49 which is thereby caused to rotate in the manner already described whereby the jets of water emerging therefrom sweep over the surface of the filter bed and tend to disintegrate material such as "floc" which has accumulated thereon.

The surface wash water which enters the chamber in this way is discharged therefrom through pipe 18 to the valve 14 through passage 28 in the valve member 26 (said passage as previously stated being in communication with the respective radial port 25) and thence through the waste water discharge pipes 31 and 32 and through the rate control valve 33 in the latter.

During the further rotation of the valve members 26 and 41 the flow of wash water through the distribution pipe 49 tends to increase due to the increased opening of the respective valves.

It will be evident also that filtered water from the remaining eleven filter chambers of the two groups tends to pass upwardly through the filter beds as soon as the surface wash commences and that the velocity of such upward flow also increases as the valve passage 29 moves into register with the respective radial port 25.

The rate at which wash water may pass into and out of the filter chamber is limited by the rate control valve 33 in the discharge pipe 32 and as the surface wash water supplied by the pump 47 is delivered at a relatively high pressure and at a controlled rate through the medium of the rate control valve 45, the arrangement provides as it were a preference for surface wash water over the upward flow of wash water.

The effective angle subtended by each of the radial ports 40 is less than the angle subtended by each of the radial ports 25 and thus, during the continued rotation of the valve members, the flow of surface wash water is finally cut off whilst the upward flow of wash water is still proceeding. Upon the cessation of the flow of surface wash the upward flow of wash water rises to the maximum permitted by the rate control valve 33 and is finally cut off as the movement of the valve member eventually closes communication between the respective filter chamber and the waste discharge pipe and simultaneously connects said filter chambers with the impure water main.

The result is that, when the operation of cleansing a filter chamber is commenced, the flow of surface wash water quickly reaches the full value permitted by the rate control valve 45 whilst the rate of flow of filtered wash water delivered to the bottom of the chamber is equal to the difference between the maximum rate of flow of all the wash water as determined by the rate control valve 33 in the waste discharge pipe and the rate of flow of the surface wash water.

As the flow of surface wash water is reduced and finally stopped during the further rotation of the control valves, the rate of flow of the wash water delivered below the filter bed progressively rises to its full value and thus serves to subject the filter bed to a normal high velocity wash.

The maximum rate of flow of surface wash water may conveniently approximate to about 20% of the maximum rate of flow of the combined wash water effluent—that is to say the rate control valve 45 may be set to permit the passage of about 20% of the total for which the rate control valve 22 is set.

In lieu of employing a rate control valve 45, the pump 47 may be of a variable speed type and may be controlled to deliver water at a constant rate.

These operations are repeated with the various filter chambers in succession whilst the valve members 26 and 41 complete one revolution. When the valve members are eventually brought to rest in one of the inoperative positions previously described by stopping the motor 35' all the filter chambers of the group are free to resume normal filtration to service.

Ordinarily, however, the second group of filter chambers would then be washed in a similar manner, means being provided if desired to cause the motor 35 of the second group to automatically start up as soon as the cleansing of the first group of chambers has been completed, suitable interlocking means being provided to prevent both motors 35 being simultaneously energised.

When all of the filter chambers have been cleansed the combined rate control and cut-off valve 22 in the common effluent pipe 21 is reopened either manually or automatically and normal filtration to service is resumed.

The effective angle subtended by the aperture 42 in each valve disc 41 may be reduced by releasing the coupling 27' and advancing the valve disc relatively to the valve member 26 of the associated distribution valve. By means of this adjustment the surface wash is terminated at an earlier point in the cleansing operation.

It will be understood that the number of filter chambers 12 to be used is influenced by various factors the chief of which are the velocity at which it is desired to effect the high velocity upward wash and the head or pressure of water available for the purpose. The arrangement shown in Figure 2 and which permits of the combined flow of filtered water from eleven filter chambers being used to effect the cleansing of the remaining chamber is suitable for efficiently carrying out the washing operation at a "high velocity" even when the filtering rate per unit of filtering area—i. e. gallons per square foot per minute—is considerably below the normal filtering rate.

In many cases, however, it is satisfactory to employ only one group of six, seven or eight filter chambers in which case each filter chamber would be cleansed by the combined flow of filtered water passing from the remaining five, six or seven chambers as the case may be. It will be evident, for example, from an inspection of Figure 2 that this result would be obtained by isolating one of the groups of filter chambers by means of the appropriate stop valves 17 and 20'.

Even when it is desired to employ as many as twelve filter chambers in combination, it would be possible to arrange them in one group provided with a single distribution valve as 14 and a single valve as 38 for controlling the surface wash water. In such circumstances, however, it is considered to be preferable to employ two sets of smaller valves as shown in Figure 2.

In a modification surface wash water may be caused to issue from all of the distribution pipes 49 in the one group of filter chambers throughout the whole or a portion of the whole washing cycle or even at intervals during normal filtration to service. This result may be conveniently attained by lifting the appropriate valve member 41 off its seat in any convenient manner without disturbing its phase relationship with the coacting valve member 26. For this purpose the valve spindle 37 is shown in Figure 3 as being slidable in the adjacent member of the coupling 27'.

In a further modification the rotary valve for distributing the surface wash water may be similar in construction to the rotary valve 14 in which case the central port in the valve and the passage as 28 in the valve member are in constant communication with the pipe 46 means being provided to hold the valve member in contact with its seat. Thus, when the outer portion of the valve passage 28 is moved into register with any one of the radially disposed parts, wash water from pipe 46 passes through valve passage 28 and thence through the port to the branch pipe 48 leading to the distribution pipe 49 in the appropriate filter chamber.

Whilst it is preferred to employ rotary valves of the kind above indicated for controlling the surface and upward flows of wash water, it will be understood that this is not essential as any form of valve mechanism by which the same operations may be performed sequentially for all the chambers in the group, may be used in lieu thereof.

Whilst the invention is directed chiefly to filters having a group of filter chambers so arranged that any one chamber may be cleansed by passing upwardly therethrough the combined filtrate from the remaining chambers of the group, it will be understood that the invention is not confined thereto. For example, the invention may be applied to a filter having only one filter chamber adapted to be cleansed when required by water obtained from an elevated storage chamber or from a low level storage chamber through the medium of a suitable pump.

It will be evident that the expression "rapid sand filter" includes a filter in which the bed is formed of material equivalent to sand, and that the expression "perforated distributing means" used in the appended claims, includes means provided with nozzles for directing jets of wash water substantially on to the surface of the filter bed.

I claim:

1. The method of cleansing an enclosed filter comprising directing water upwardly through a filter bed therein, directing a second flow of wash water adjacent to the surface of the filter bed in the form of jets having a relatively high velocity, said upward and surface flows of wash water commencing substantially simultaneously and while the filter bed is entirely submerged in water, maintaining substantially constant the rate of flow of surface wash water, terminating the flow of surface wash water while the said upward flow is still proceeding, and maintaining the flow of effluent wash water at a substantially constant rate sufficient to cause the filter bed to be subjected to an upward wash at "high velocity" after the said surface wash has terminated.

2. The method of cleansing a filter according to claim 1, wherein the maximum rate of flow of surface wash water is approximately 20 per cent of the maximum rate of flow of effluent wash water.

3. In a filter an enclosed filter chamber, a filter bed therein, means for supplying impure water to said chamber above the filter bed therein, perforated distributing means arranged above and adjacent to the surface of the filter bed, means including a rate control valve for directing water at a relatively high pressure to said perforated distributing means, means including a rate control valve for discharging waste wash water from an upper portion of the filter chamber, said last-mentioned rate control valve being effective to pass water at a higher rate of flow than said first-mentioned rate control valve, means for introducing filtered wash water below the filter bed to pass upwardly therethrough, valve means operable to shut off the supply of impure water to the filter chamber and to establish communication between the filter chamber and the means for discharging waste wash water therefrom, valve means operable to establish communication between the said perforated distributing means and the means for directing water thereto, and means operable to actuate said first and second-mentioned valve means in predetermined relationship whereby said means for discharging waste wash water and said second-mentioned valve means will be opened substantially in unison and said second-mentioned valve means will be closed before said means for discharging waste wash water is closed.

4. In a filter an enclosed filter chamber, a filter bed therein, means for supplying impure water to said chamber above the said filter bed, perforated distributing means arranged above and adjacent to the surface of the filter bed, means including a rate control valve for directing water at a relatively high pressure to said perforated distributing means, means including a rate control valve for discharging waste wash water from an upper portion of the filter chamber, said last-mentioned rate control valve being effective to pass water at a higher rate of flow than said first-mentioned rate control valve, means for introducing filtered wash water below the filter bed to pass upwardly therethrough, a rotary valve member operable to shut off the supply of impure water to the filter chamber and to open said means for discharging waste wash water therefrom, a second rotary valve means operable to place said perforated distributing means in communication with said means for directing water thereto and means operable to actuate said first and second-mentioned rotary valve members in unison, said rotary valve members being mutually arranged whereby the flow of water through said perforated distributing means is terminated prior to the termination of the flow of waste wash water through said discharge means therefor, and means for adjusting the phase relationship between said rotary valve members.

5. In a filter, a group of enclosed filter chambers, filter beds therein, valve means for controlling the supply of impure water to the upper ends of said filter chambers, a common pipe for discharging filtered water passing from the lower ends of the said filter chambers, a cut-off valve in the said common pipe, valve means operable to permit the discharge of waste wash water from the upper end of each individual filter chamber independently of the remaining filter chambers of the said group, means operable to maintain a substantially uniform rate of discharge of waste wash water from each chamber during the cleansing operation thereof, wash water distributing means arranged within each filter chamber above and adjacent to the surface of the filter bed therein, valve means operable to control the supply of wash water under a relatively high pressure to the distributing means of each filter chamber independently of the distributing means in the remaining chambers, means operable to maintain a substantially uniform rate of flow of wash water through the distributing means of each chamber whilst said distributing means are operative, and means operable to actuate said first, second and third mentioned valve means in unison to effect the cleansing of any individual filter chamber whereby the supply of impure water to said chamber is cut off and said chamber is placed in communication with the discharge means for waste wash water substantially in unison with the supply of water to the distributing means of the said chamber, said second and third mentioned valve means being mutually arranged so that the supply of water to said distributing means is cut off prior to communication being closed between the filter chamber and the means for discharging waste wash water therefrom.

6. In a filter, a group of enclosed filter chambers, filter beds therein, valve means operable to control the supply of impure water to the upper ends of said filter chambers, a common pipe for discharging filtered water passing from the lower ends of the said filter chambers, a cut off valve in the said common pipe, a common pipe for the discharge of waste wash water from the said filter chambers, a rate control valve in said common pipe, valve means operable to permit the discharge to said common pipe of waste wash water from the upper end of each individual filter chamber independently of the remaining filter chambers of the said group, wash water distributing means arranged within each filter chamber above and adjacent to the surface of the filter bed therein, valve means operable to control the supply of wash water under a relatively high pressure to the distributing means of each filter chamber independently of the distributing means in the remaining filter chambers, means operable to maintain a substantially uniform rate of flow of wash water through the distributing means of each chamber whilst said distribution means are operative, and means operable to actuate said first, second and third mentioned valve means in unison to effect the cleansing of any individual filter chamber whereby the supply of impure water to said filter chamber is cut off and said chamber is placed in communication with said common pipe for the discharge of waste wash water substantially in unison with the supply of water to the distributing means of the said chamber, said second and third-mentioned valve means being mutually arranged so that the supply of wash water to said distributing means is cut off prior to communication being closed between the filter chamber and said common pipe for discharging waste wash water therefrom.

7. In a filter, a group of enclosed filter chambers, filter beds therein, valve means operable to control the supply of impure water to the upper ends of said filter chambers, a common pipe for discharging filtered water passing from the lower ends of the said filter chambers, a cut-off valve in the said common pipe, valve means operable to permit of the discharge of waste wash water from the upper end of each individual filter chamber independently of the remaining filter chambers of the said group, means operable to maintain a substantially uniform rate of discharge of waste wash water from each filter chamber during the cleansing operation thereof, wash water distributing means arranged within each filter chamber above and adjacent to the surface of the filter bed therein, a common wash water pipe for supplying wash water under a relatively high pressure to the said distributing means, a rate control valve in said common wash water pipe, said rate control valve being effective to permit the passage of water into each filter chamber at a lower rate of flow than the rate at which waste wash water is discharged therefrom, valve means associated with the common wash water pipe for controlling the supply of wash water to the distributing means of each filter chamber independently of the distributing means in the remaining filter chambers and means operable to actuate said first, second and third mentioned valve means in unison to effect the cleansing of any individual filter chamber whereby the supply of impure water to said filter chamber is cut off and said chamber is placed in communication with the discharge means for waste wash water substantially in unison with the supply of wash water to the distributing means of the said filter chamber, said second and third-mentioned valve means being mutually arranged so that the supply of wash water to said distributing means is cut off prior to communication being closed between the filter chamber and the means for discharging waste wash water therefrom.

8. In a filter, a group of enclosed filter chambers, filter beds therein, valve means operable to control the supply of impure water to the upper ends of said filter chambers, a common pipe for discharging filtered water passing from the lower ends of the said filter chambers, a cut-off valve in the said common pipe, valve means operable to permit of the discharge of waste wash water from the upper end of each individual filter chamber independently of the remaining filter chambers of the said group, means operable to maintain a substantially uniform rate of discharge of waste wash water from each filter chamber during the cleansing operation thereof, wash water distributing means arranged within each filter chamber above and adjacent to the surface of the filter bed therein, a common wash water pipe for supplying wash water under a relatively high pressure to the said distributing means, a rate control valve in said common wash water pipe, said rate control valve being effective to permit the passage of water into each filter chamber at a lower rate of flow than the rate at which waste wash water is discharged therefrom, a valve chamber connected to said common wash water pipe, a valve seat in the valve chamber, said valve seat being formed with a plurality of radially arranged ports each of which communicates with the distributing means of one of the filter chambers, a rotary valve member engaging said valve seat whereby it may be moved into register with any one of said ports to permit of the passage of wash water to the distributing means of the corresponding filter chamber, and means operable to actuate said first and second mentioned valve means and said rotary valve member in unison to effect the cleansing of any individual filter chamber whereby the supply of impure water to said filter chamber is cut off and said chamber is placed in communication with the discharge means for waste wash water substantially in unison with the supply of wash water to the distributing means of the said filter chamber, said second-mentioned valve means and said rotary valve member being mutually arranged so that the supply of wash water to said distributing means is cut off prior to communication being closed between the filter chamber and the means for discharging waste wash water therefrom.

9. In a filter, a group of five or more enclosed filter chambers, filter beds therein, a valve casing having a distribution chamber therein, means for supplying impure water thereto, a valve seat in the distribution chamber and provided with a plurality of radially disposed ports each of which communicates with an upper portion of one of the said filter chambers, a waste wash water discharge pipe connected to the valve casing, a rate control valve in the said discharge pipe, a rotary valve member engaging the valve seat, means for moving said rotary valve member into register with any of the radially disposed ports to prevent the passage of impure water thereto and simultaneously connect same with the said waste wash water discharge pipe, a distributing member in each filter chamber adjacent to the surface of the filter bed therein, each said distributing member having therein a plurality of openings for the discharge of wash water, a second valve casing, a valve seat in said second valve casing and provided with a plurality of radially disposed ports, each of said ports being connected with the distributing member in one of said filter chambers, a pipe for supplying wash water under a relatively high pressure to the last-mentioned valve casing, a rate control valve in said pipe, a rotary valve member in the valve casing, said rotary valve member being movable into register with any one of the radially disposed ports therein to permit the passage therethrough of wash water, and means connecting the said rotary valve members whereby same are operable in unison.

10. In a filter, an enclosed filter chamber, a filter bed therein, means for introducing wash water below the filter bed to pass upwardly therethrough, means for directing wash water at a substantially uniform rate of flow and under a relatively high pressure adjacent to the surface of the filter bed, valve means operable to start and stop the upward flow of wash water, valve means operable to start and stop the flow of surface wash water, means operable to actuate said first and second mentioned valve means in predetermined relationship whereby the respective flows of wash water will commence substantially in unison and the flow of surface wash water will be terminated while the upward flow of wash water is still proceeding, wash water effluent means, and means for maintaining a substantially uniform rate of flow through said wash water effluent means.

11. In a filter, an enclosed filter chamber, a filter bed therein, means for discharging waste wash water from an upper portion of the filter chamber, said means including a rate control valve, distributing means within the filter chamber and adjacent to the surface of the filter bed for discharging jets of water thereonto, means including a rate control valve for delivering water under a relatively high pressure to said distributing means, the last-mentioned rate control valve being adapted to pass water at a lower rate than the first-mentioned rate control valve, means for introducing filtered wash water below the filter bed to pass upwardly therethrough, means operable to start and stop the flow of water through said means for discharging waste water from an upper portion of the filter chamber, means operable to start and stop the flow of water through said distributing means, and means operable to actuate said two last-mentioned means in predetermined order to cause said flows of water to commence substantially in unison and to cause the flow of water through said distributing means to stop while the discharge of waste wash water is still proceeding.

12. The method of cleansing a filter having a group of enclosed filter chambers each of which is in constant communication with a common discharge for filtered water, comprising closing said common discharge and successively subjecting the filter beds in the individual chambers to a cleansing operation, each such cleansing comprising suspending the supply of raw water to the respective filter chamber, directing jets of surface wash water at a predetermined and substantially uniform rate and at a relatively high velocity onto the surface of the filter bed, said surface wash water being subjected to a pressure which is greater than the pressure of the filtered water discharged from the remaining filter chambers, and discharging wash water effluent from the filter chamber at a predetermined and substantially uniform rate which rate is substantially in excess of the rate of flow through said jets whereby the pressure in the aforesaid common discharge will cause filtered water to pass simultaneously upwards through the filter bed, terminating the flow of surface wash water while said upward flow is proceeding whereby the rate of said upward flow will increase, substantially terminating the discharge of effluent wash water and restoring communication between said filter chamber and the raw water supply and finally reopening the common discharge for filtered water.

13. In a filter, an enclosed filter chamber, a filter bed therein, means for supplying impure water to said chamber above the said filter bed, supporting means, perforated distributing means mounted on said supporting means for rotation in a substantially horizontal plane, said distributing means being disposed within the filter chamber above and adjacent to the surface of the filter bed, means including a rate control valve for directing wash water to said rotatable perforated distributing means, means including a rate control valve for discharging waste wash water from an upper portion of the filter chamber, said last-mentioned rate control valve being effective to pass water at a higher rate of flow than said first-mentioned rate control valve, means for introducing filtered wash water below the filter bed to pass upwardly therethrough, valve means operable to shut off the supply of impure water to the filter chamber and to open said means for discharging waste wash water therefrom, further valve means operable to place said rotatable perforated distributing means in communication with a source of wash water at a relatively high pressure, and means operable to actuate said first and second-mentioned valve means in predetermined relationship whereby said means for discharging waste wash water and said second-mentioned valve means will be opened substantially in unison and said second-mentioned valve means will be closed before said means for discharging waste wash water is closed.

14. In a filter, an enclosed filter chamber, a filter bed therein, means for supplying impure water to said chamber above the said filter bed, supporting means, distributing means rotatively mounted on said supporting means and disposed substantially horizontally above and adjacent to the surface of the filter bed, said distributing means being provided with openings for the discharge therefrom of jets of wash water and said openings being positioned so that the reaction of said jets will impart rotation to the distributing member, means including a rate control valve for directing wash water to the interior of said distributing means, means including a rate control valve for discharging waste wash water from an upper portion of the filter chamber, said last-mentioned rate control valve being effective to pass water at a higher rate than said first-mentioned rate control valve, means for introducing filtered wash water below the filter bed to pass upwardly therethrough, valve means operable to shut off the supply of impure water to the filter chamber, valve means operable to open said means for discharging waste wash water from the filter chamber, valve means operable to place said distributing means in communication with a source of wash water under a pressure which is substantially greater than the pressure of wash water introduced below the filter bed, and means operable to actuate said first, second and third mentioned valve means in predetermined relationship whereby said first-mentioned valve means will be closed and said second and third-mentioned valve means will be opened substantially in unison and said third-mentioned valve means will be closed in advance of said second-mentioned valve means.

MICHAEL JAMES MARTIN.